(12) United States Patent
Plantan et al.

(10) Patent No.: US 11,345,207 B2
(45) Date of Patent: May 31, 2022

(54) ELECTRICALLY CONTROLLED SUSPENSION

(71) Applicant: Bendix Commercial Vehicle Systems, LLC, Elyria, OH (US)

(72) Inventors: Ronald S. Plantan, Mooresville, NC (US); Ross A. Gresley, Catawba, NC (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 541 days.

(21) Appl. No.: 16/385,965

(22) Filed: Apr. 16, 2019

(65) Prior Publication Data
US 2020/0331314 A1    Oct. 22, 2020

(51) Int. Cl.
*B60G 17/015* (2006.01)
*B60G 17/02* (2006.01)
*B60G 17/005* (2006.01)

(52) U.S. Cl.
CPC ......... *B60G 17/015* (2013.01); *B60G 17/005* (2013.01); *B60G 17/023* (2013.01); *B60G 2202/112* (2013.01); *B60G 2202/42* (2013.01); *B60G 2204/121* (2013.01); *B60G 2204/41* (2013.01); *B60G 2204/43* (2013.01); *B60G 2206/428* (2013.01); *B60G 2500/106* (2013.01); *B60G 2500/30* (2013.01)

(58) Field of Classification Search
CPC .. B60G 17/015; B60G 17/005; B60G 17/023; B60G 2202/112; B60G 2202/42; B60G 2204/121; B60G 2204/41; B60G 2204/43; B60G 2206/428; B60G 2500/106; B60G 2500/30

USPC ...................... 280/124.163, 124.17, 124.175
See application file for complete search history.

(56) References Cited

U.S. PATENT DOCUMENTS

| | | | |
|---|---|---|---|
| 3,484,091 A | 12/1969 | Draves | |
| 4,982,972 A * | 1/1991 | Preston | B60G 17/0275 280/124.101 |
| 5,035,408 A | 7/1991 | Walton et al. | |
| 5,098,121 A * | 3/1992 | Walton | B60G 11/04 280/124.156 |
| 5,123,672 A | 6/1992 | Walton et al. | |
| 5,129,633 A * | 7/1992 | Walton | B60G 11/04 267/265 |
| 5,137,300 A * | 8/1992 | Walton | B60G 11/04 267/261 |
| 5,172,930 A * | 12/1992 | Boye | B60G 11/04 280/124.102 |
| 5,188,195 A * | 2/1993 | Haustein | B60G 11/465 180/353 |

(Continued)

*Primary Examiner* — Toan C To
(74) *Attorney, Agent, or Firm* — Crowell & Moring LLP

(57) ABSTRACT

An electrically controlled suspension includes a first spring with a first end and a second end, where the first end of the first spring is connectable to a forward frame bracket of a frame of a vehicle and where the second end of the first spring is connectable to a rear frame bracket of the frame of the vehicle via a rear spring support. The suspension includes a second spring with a first end and a second end, where the second end of the second spring is connected to the second end of the first spring. An electrically operated suspension control actuator is provided where the first end of the second spring is connected to the electrically operated suspension control actuator.

24 Claims, 10 Drawing Sheets

(56) References Cited

U.S. PATENT DOCUMENTS

| | | | | |
|---|---|---|---|---|
| 6,739,608 | B2* | 5/2004 | Warinner | B60G 21/073 |
| | | | | 280/124.163 |
| 7,052,001 | B2 | 5/2006 | Hitt et al. | |
| 7,144,031 | B2* | 12/2006 | Fenton | B60G 5/00 |
| | | | | 280/682 |
| 7,246,808 | B2* | 7/2007 | Preijert | B60G 5/04 |
| | | | | 280/124.17 |
| 7,950,678 | B1* | 5/2011 | Bauder | B60G 11/02 |
| | | | | 280/43.18 |
| 8,434,747 | B2 | 5/2013 | Dudding et al. | |
| 8,919,795 | B2 | 12/2014 | Juriga | |
| 9,174,507 | B2* | 11/2015 | Soles | B60G 11/04 |
| 2003/0085497 | A1 | 5/2003 | Wilson | |
| 2004/0090032 | A1* | 5/2004 | Raleigh | B60G 11/04 |
| | | | | 280/124.17 |
| 2007/0145656 | A1* | 6/2007 | Svendsen | F16F 1/26 |
| | | | | 267/260 |
| 2009/0085318 | A1 | 4/2009 | Guthrie | |
| 2010/0253032 | A1* | 10/2010 | Ramsey | B60G 11/27 |
| | | | | 280/124.162 |
| 2012/0193887 | A1* | 8/2012 | Muck | B60G 17/023 |
| | | | | 280/124.163 |
| 2014/0117639 | A1* | 5/2014 | Ramsey | B60G 9/04 |
| | | | | 280/124.11 |
| 2021/0078397 | A1* | 3/2021 | Ito | B60K 1/00 |
| 2021/0155064 | A1* | 5/2021 | Palandri | B60G 11/187 |

\* cited by examiner

ELECTRICALLY CONTROLLED SUSPENSION

FIELD OF THE INVENTION

The invention relates to an electrically controlled suspension for a motor vehicle.

BACKGROUND OF THE INVENTION

Electric powered vehicles tend to be considerably heavier and much more expensive than today's diesel power commercial vehicles, but they offer the potential for significantly lower cost of fuel (electricity vs. diesel) and a more reliable drive train. There are also other advantages in emissions and vehicle acceleration capability. Since batteries are the main reason for the high cost and weight penalty, it raises concerns over adding batteries for additional travel range vs. battery cost and the loss of cargo hauling capacity. Therefore, it is very desirable to reduce the cost and weight of the vehicle to make the all-electric vehicle (BEV—battery electric vehicle) more competitive. Design changes in subsystems to take advantage of the electric power available to save cost and weight would be a big benefit. One of these subsystem opportunities is replacing today's ubiquitous air suspension with an electrically controlled low cost and lighter weight leaf spring suspension that has electrically controlled ride height and spring rate. It is also an opportunity to add desirable functions without increasing cost or weight.

Air suspensions are popular because they provide excellent ride comfort for the driver and reduced cargo damage. Another big advantage is the nearly constant ride height with various vehicle loads. This feature is very important with softer riding suspensions for bridge and tunnel height limits. Air suspensions provide an excellent solution for improved ride quality over previous leaf spring and rubber suspensions. They rely on changing air pressure in air bags for constant ride height and variable load carrying capability. It is also very important to note that increasing air pressure also increases the suspension rate to maintain ride quality and vehicle stability. The spring rate increases in proportion to the load increase. The ride improvement from air suspensions is primarily from a much lower spring rate suspension and reduced friction compared to multi-leaf steel or rubber spring suspensions. The softer spring rate requires the addition of a sway bar (anti-roll) feature for stability and preventing excessive lean in turning and lane changing maneuvers. A constant ride height feature is very desirable and often required to compensate for the large variation in vehicle overall height from the low spring rate suspension. New air suspensions under development will also have several ride height positions; a lower ride height for highway speeds to reduce wind resistance and a higher ride height during low speed maneuvering to eliminate potential damage to aerodynamic skirts in roadway pothole conditions.

Trailer suspension stability is also very important during loading and unloading in docks. Many trailers are loaded and unloaded with lift trucks which have caused stability problems (excessive leaning) during docking. The soft (good riding) suspensions often have an option to lock out the suspension to provide stability during docking operations.

However, air suspensions require a compressed air source (compressor), air lines, storage tanks, control valves, air springs, and a robust suspension to withstand lateral load during handling and turning maneuvers as well as during heavy braking loads. Replacing the air ride suspension can reduce vehicle complexity, weight, and cost, particularly on BEVs.

Reasonable goals for any new suspension is that it should meet or exceed the ride quality, durability, and performance of today's very successful air ride suspensions.

Therefore, there is a need for a non-air suspension with variable rate for good ride quality that can be adjusted to maintain programmed constant ride heights with sway control (anti-roll) for good handling. Additional benefits will provide for serviceability, dock loading stability, and various ride height positions for highway, city and off-highway conditions.

SUMMARY OF THE INVENTION

In one embodiment of the present invention, an electrically controlled suspension includes a first spring with a first end and a second end, where the first end of the first spring is connectable to a forward frame bracket of a frame of a vehicle and where the second end of the first spring is connectable to a rear frame bracket of the frame of the vehicle via a rear spring support. The suspension includes a second spring with a first end and a second end, where the second end of the second spring is connected to the second end of the first spring. An electrically operated suspension control actuator is provided where the first end of the second spring is connected to the electrically operated suspension control actuator.

In an embodiment of the method of the present invention, the method includes moving the first end of the second spring by the electrically operated suspension control actuator to a first position, where when the first end of the second spring is in the first position the second spring engages the first spring over a first length, and moving the first end of the second spring by the electrically operated suspension control actuator to a second position where when the first end of the second spring is in the second position the second spring engages the first spring over a second length. The second length is greater than the first length.

Other objects, advantages and novel features of the present invention will become apparent from the following detailed description of one or more preferred embodiments when considered in conjunction with the accompanying drawings.

DESCRIPTION OF EXEMPLARY EMBODIMENTS OF THE INVENTION

Figure 1:
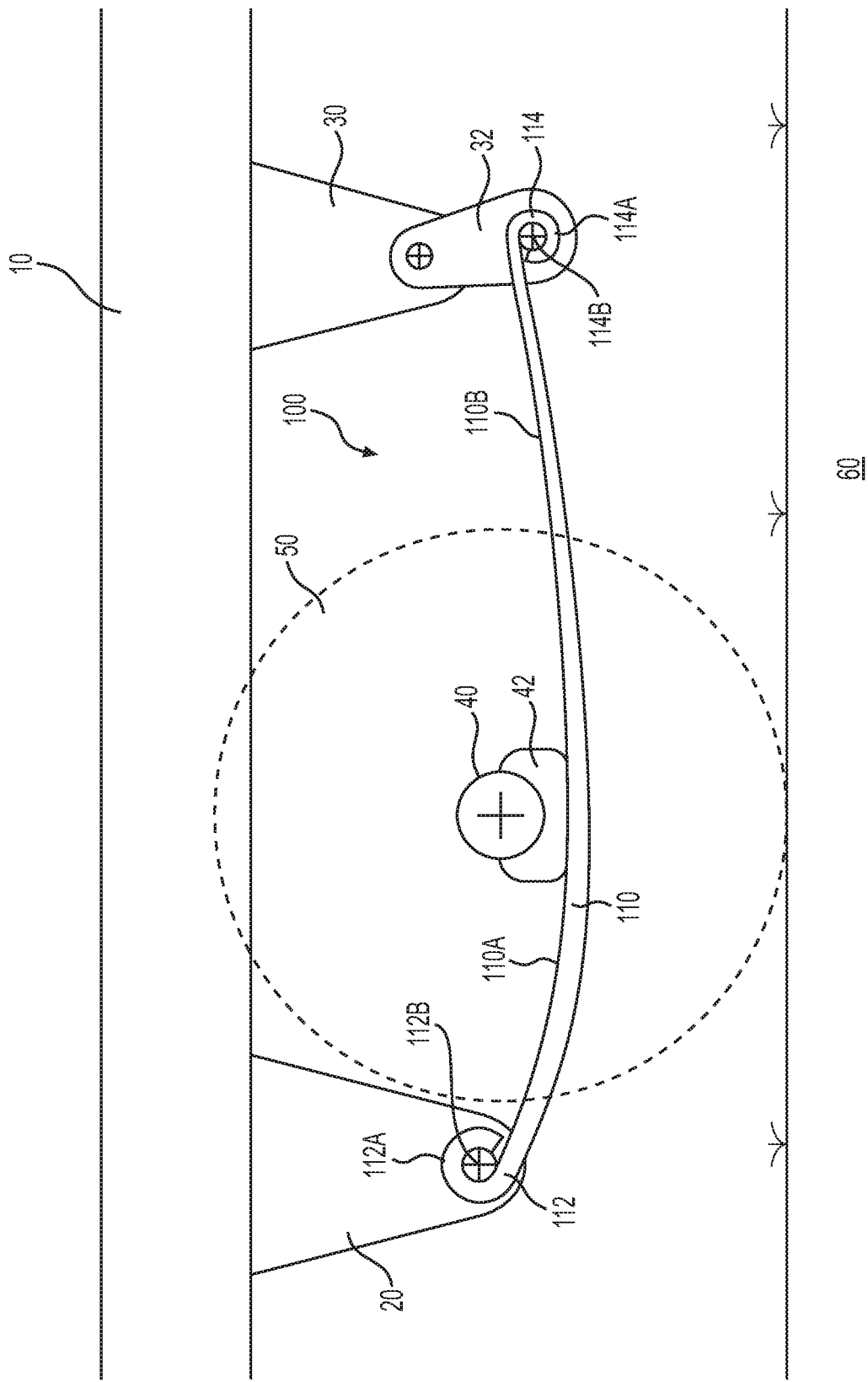
FIG. 1 illustrates a trailer frame of a vehicle with a main spring of the suspension of the present invention.

In the following description of the present invention reference is made to the accompanying Figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

As will be further discussed below, Applicant's invention replaces the ubiquitous current air suspension with an electrically controlled ride height suspension incorporating a low cost and light weight leaf spring suspension with provisions for controlling ride height and spring rate. It incorporates a simple low cost asymmetrical leaf spring design where the forward section of the leaf spring is designed for the heaviest suspension loads and the rear section has a soft spring rate to provide excellent ride quality when the vehicle is lightly loaded. As the suspension load increases, an adjustable suspension control actuator progressively engages a ride control spring onto the leaf spring from the rear shackle forward that stiffens the rear section of the leaf spring and maintains the desired suspension ride height. The forward portion of the leaf spring provides sway control equal to today's popular air suspensions as it acts like a sway bar to keep the vehicle body roll to a minimum during turning maneuvers and high speed cornering. This forward portion of the leaf spring also carries a portion of the vertical loads. This feature is common to many current air suspensions. The suspension control actuator can also raise one axle on a tandem when the vehicle is light to reduce rolling resistance for better fuel economy when lightly loaded. This is also an advantage in tire changing and wheel end maintenance.

Further with the present invention, as with some trailer suspensions today, an option is provided to lock the suspension during docking. Taking advantage of the electrically controlled ride, the dock locking feature provides additional docking heights for better matching of the trailer floor height to the dock height.

Thus, with the suspension of the present invention, there are at least three distinctly different suspension modes that can be implemented. A brief synopsis of these modes are provided below and they will be discussed further later in this specification:

Ride Dynamics Mode—suspension ride height and spring rate control from vehicle empty to fully loaded condition with various control ride heights and adjustability for highway, city and low speed maneuvering;

Docking Mode—suspension locking at various heights for better matching to various dock heights and stability during trailer loading and unloading; and Axle Lift Mode—for fuel economy improvement when vehicle is partially loaded and can be used for ease of wheel end maintenance, servicing wheels, tires, brakes, etc.

Therefore, in continuing with the description of the present invention, FIG. 1 illustrates a trailer frame 10 of a vehicle with a first spring 110 of the suspension 100 of the present invention. This first spring may also be referred to as a main spring of the suspension and this main spring may be an asymmetrical leaf spring.

FIG. 1 only shows the main leaf spring 110 of the suspension 100. This first spring 110 has a first end 112 and a second end 114. The first end 112 is connected to a forward frame bracket 20 of the frame 10 of the vehicle and the second end 114 is connected to a rear frame bracket 30 of the frame 10 via a rear spring support, which in this embodiment is a shackle 32. Thus, a front eye 112A of the first spring 110 is connected the forward frame bracket 20 via, for example, a pin 112B and a rear eye 114A is connected to the rear shackle 32 via, for example, a pin 114B. The rear shackle 32 increases the lateral load carrying capability and eliminates the need for the heavy and expensive track rods of the prior art. The rear eye 114A is a down turned eye which is important for interfacing to the ride control spring of the suspension, as will be further described later in this specification. In this specification, the references to forward and rear, and other associated directions, are in relation to the vehicle, i.e., the front of the vehicle, rear of the vehicle, etc.

The first spring 110 is also connected to the axle 40 of the vehicle, which axle supports a wheel 50. The wheel 50 is shown in phantom on the road surface 60 so that portions of the first spring 110 are not obscured. The first spring 110 can be attached to axle 40 by a coupling 42, which can be, for example, any of the known devices for coupling a suspension to an axle.

As mentioned previously, the first spring 110 can be an asymmetrical leaf spring. As such, the forward portion 110A of the first spring 110 is thicker, shorter, and stiffer than the rear portion 110B of the first spring. Such asymmetrical leaf springs are known in the prior art and can be used in the suspension of the present invention. Alternatively, the asymmetrical leaf spring may have forward and rear portions that are asymmetrical with respect to their thickness and stiffness, however, they may have symmetrical lengths. The rear portion would still provide the softer spring rate. The rear portion of the first spring must be thin for load controllability. For example, the rear portion could have about ¼ to ⅙ the spring rate of the forward portion for the soft spring rate in the lightly loaded conditions. The rear portion is softer than the front portion to adjust the ride via a second spring, which will be discussed further below. The Figures provide schematic drawings of the components of the suspension, and thus, are not drawn to scale, and as such, the characteristics of the leaf spring are not shown to scale.

Figure 2A:
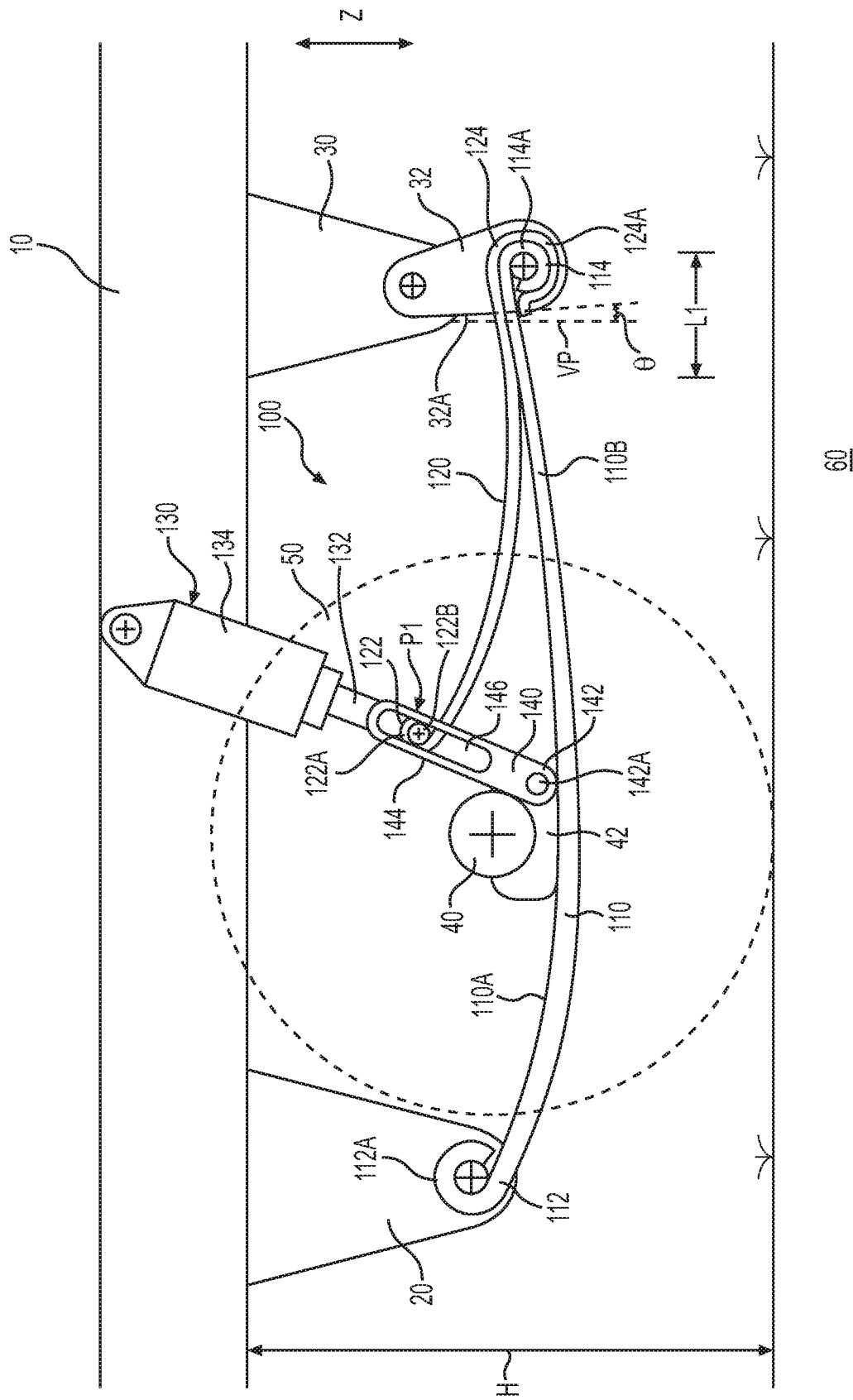
FIG. 2A illustrates the suspension of FIG. 1 with a ride control spring and an electrically operated suspension control actuator of the present invention where the suspension is in a lightly loaded or empty condition.

FIG. 2A illustrates the suspension of FIG. 1 with a second spring 120 of the suspension 100 and an electrically operated suspension control actuator 130 of the suspension 100. The second spring 120 may also be referred to a ride control spring. In FIG. 2A, the suspension 100 is shown in a lightly loaded or empty condition. A constant ride height H with respect to the road surface 60 obtainable by the suspension 100 of the present invention is shown in FIG. 2A.

The second spring 120 has a first end 122 that is connected to the electrically operated suspension control actuator 130 via, for example, an eye 122A of the second spring 120 and a pin 122B that can be part of the suspension control actuator 130 or that is connected to the actuator 130. A second end 124 of the second spring 120 is connected to the second end 114 of the first spring 110, and thus, also to the shackle 32. An eye 124A at the second end 124 of the second spring 120 engages around the down turned eye 114A of the first spring 110. Thus, there is a close fit of the outside diameter of the down turned eye 114A of the first spring 110 to the inside diameter of the eye 124A of the second spring 120. This interface facilitates a smooth rolling contact of the second spring 120 with the rear of the first spring 110 as the second spring progressively engages with the first spring 110. The interface can be cushioned with an elastomer for reduced wear from contact and noise mitigation.

The suspension control actuator 130 is electrically operated and electrical power to operate the actuator 130 may be provided by the electrical system of the vehicle, e.g., the BEV. Thus, the actuator includes an electrically operated motor that is used to move at least a portion of the actuator in a generally up and down direction Z, which up and down direction is in reference to the vertical direction of the vehicle with respect to the road surface 60, as discussed previously. The electrically operated suspension control actuator is used to control the engagement of the second spring 120 with the first spring 110 to maintain the desired ride height and ride quality of the vehicle.

As such, the suspension control actuator 130 may include a translationally movable member 132 that is an electrically operated actuator that may be, for example, a screw jack that is extendable from, and retractable into, a housing 134 of the actuator 130. Also, the translationally movable member could be a hydraulic lock or any other mechanism that can hold linear motion.

To control the engagement of the second spring 120 with the first spring 110 to maintain the desired ride height and ride quality of the vehicle in the ride dynamics mode, the first end 122 of the second spring 120 is movable by the electrically operated suspension control actuator 130. FIG. 2A, which illustrates the suspension 100 in a lightly loaded or empty condition of the vehicle, shows the first end 122 of the second spring 120 moved to a first position P1 by the electrically operated suspension control actuator 130. Thus, the screw jack 132, which is coupled to the first end 122 of the second spring 120, is moved accordingly to position the first end 122 at the first position P1. When the first end 122 of the second spring 120 is in this first position P1, the second spring 120 engages the first spring 110 over a first length L1. This engagement of the second spring 120 with the first spring 110 over this first length L1 provides for a soft spring rate for the rear portion 110B of the first spring 110 which provides excellent ride quality when the vehicle is lightly loaded/empty.

Thus, the suspension of the present invention is an electrically controlled suspension by adjusting an electrically operated suspension control actuator to move a ride control spring for progressive engagement with a main leaf spring.

As further shown in FIG. 2A, and as will be explained further later in this specification, the suspension can further include a lift link 140. The lift link 140 is coupled between the electrically operated suspension control actuator 130 and the first spring 110 and the lift link 140 is movable by the electrically operated suspension control actuator 130. As such, the lift link 140 can be connected to the coupling 42 at a first end 142 via pin 142A and coupled to the first end 122 of the second spring 120 and the screw jack 132 of the actuator 130 at a second end 144. Whereas the lift link 140 is not required for the movement of the first end 122 of the second spring 120 by the actuator 130, this movement can be guided by a guide 146 of the lift link 140. The guide 146 is a slot defined by the lift link 140, within which, the pin 122B is guidable. As such, the pin 122B, which is coupled to the second end 122 of the second spring 120 and the screw jack 132 of the actuator 130, can be guided in the guide 146 of the lift link 140 as the second end 122 of the second spring 120 is moved by the actuator 130. If the lift link 140 is not provided in the suspension 100 of the present invention, the pin 122A, and thus the first end 122 of the second spring 120, can still be moved by the screw jack 132 in the vertical direction since the screw jack 132 is a rigid member. The primary utility for the lift link in the present invention is for operation of the suspension in the axle lift mode, as will be further explained in connection with FIG. 5.

Thus, for the suspension 100 in this lightly loaded/empty condition of the vehicle as shown in FIG. 2A, anti-sway control is accomplished with the first spring 110 where the forward portion 110A of the first spring 110 is thicker, shorter and stiffer than the rear portion 110B of the first spring 110. This provides a stiffer spring rate in the forward portion 110A of the first spring 110 and a much softer spring rate on the rear portion 110B. The stiffer forward portion 110A not only provides a portion of the suspension load carrying, but it also provides reaction for both braking and start up traction loads. The stiffer forward portion 110A acts like a sway bar to resist the leaning loads during vehicle corning or lane changing. This anti-sway action is accomplished by transferring a moment through the axle 40 to a suspension on the opposite side of the vehicle. The longer rear portion 110B of the first spring 110 has a very long active spring length (soft spring rate) when the vehicle is empty and, as will be further explained, a shorter effective length (higher spring rate) when the vehicle is fully loaded. The rear shackle 32 combined with the front spring eye 112A is capable of controlling lateral loads eliminating the need for lateral track rods used on most air suspensions. Lateral track rods on most air suspensions systems today are usually very robust (heavy and expensive) to resist the very high lateral loads during tight turn maneuvers.

Further regarding the relationship between the rear shackle 32 and the front spring eye 112A, a front face 32A of the shackle 32 is at an angle θ with respect to a vertical plane VP. This angle θ of the front face 32A, in combination with the attachment of the first end 112 of the first spring 110 to the forward frame bracket 20 of the vehicle, enhances the ability of the first spring 110 to control lateral loads. This angle θ can be determined as a result of the particular ride characteristic desired, however, an angle of approximately 5°±2-3° is contemplated.

Figure 2B:
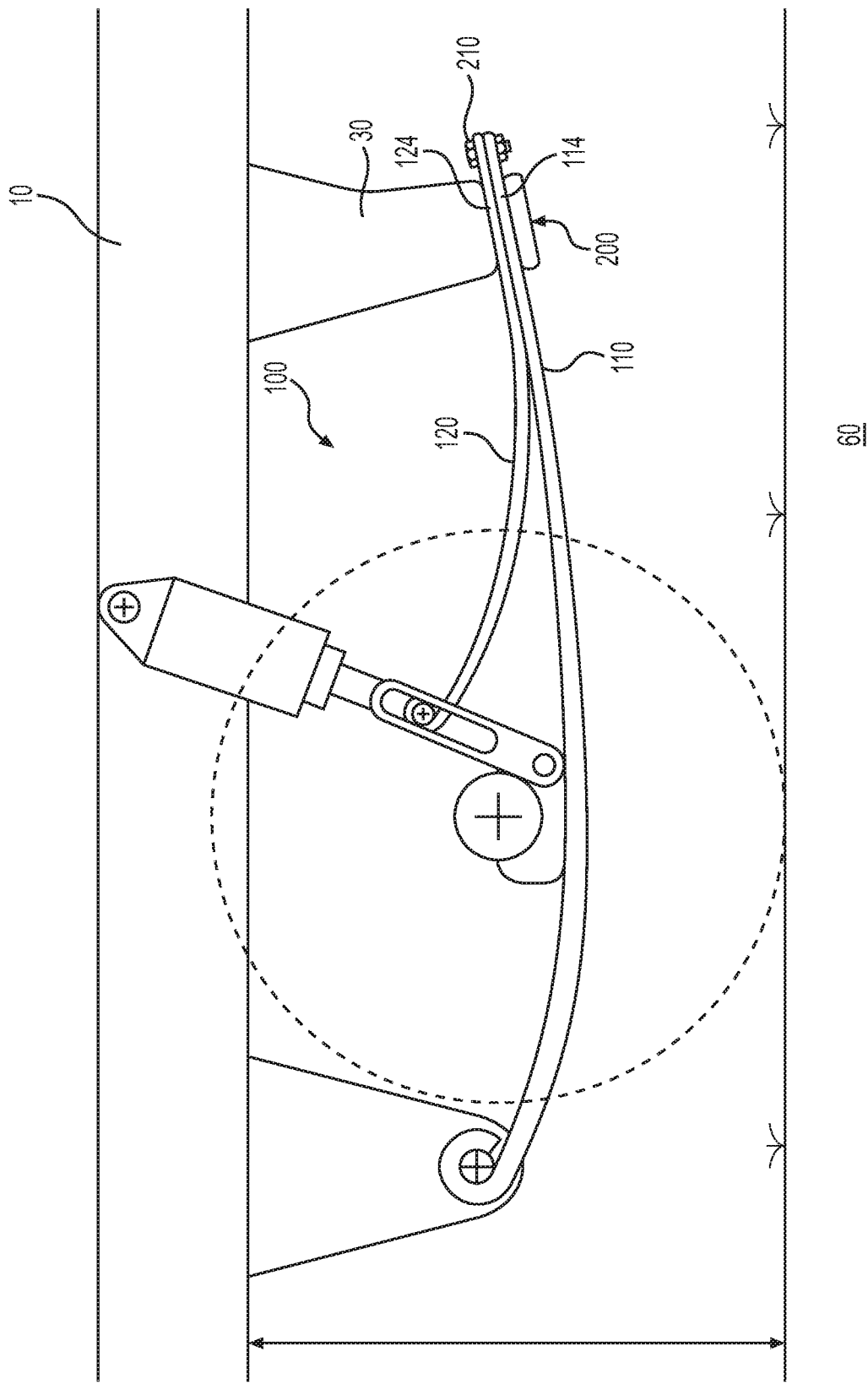
FIG. 2B is a schematic illustration of an alternative embodiment of the suspension of FIG. 2A.

FIG. 2B illustrates an alternative embodiment of the suspension of FIG. 2A with the difference being the structure of the rear spring support, as discussed above, and thus, the configuration for the second ends of the springs. Thus, in this embodiment, the second end 114 of the first spring 110 and the second end 124 of the second spring 120 are bolted to each other via a bolt 210 and are connected to the rear frame bracket 30 of the frame 10 via a slipper 200. The slipper 200 is connected directly on the rear frame bracket 30, or can be disposed in the rear frame bracket, and is only very schematically identified in FIG. 2B to contrast with the shackle 32 and respective eyes at the second ends of the springs 110, 120 of FIG. 2A. The slipper can be protected by a boot (not shown). The slipper is a lighter, simpler, lower cost alternative to the shackle. It also has high frequency isolation.

Figure 2C:
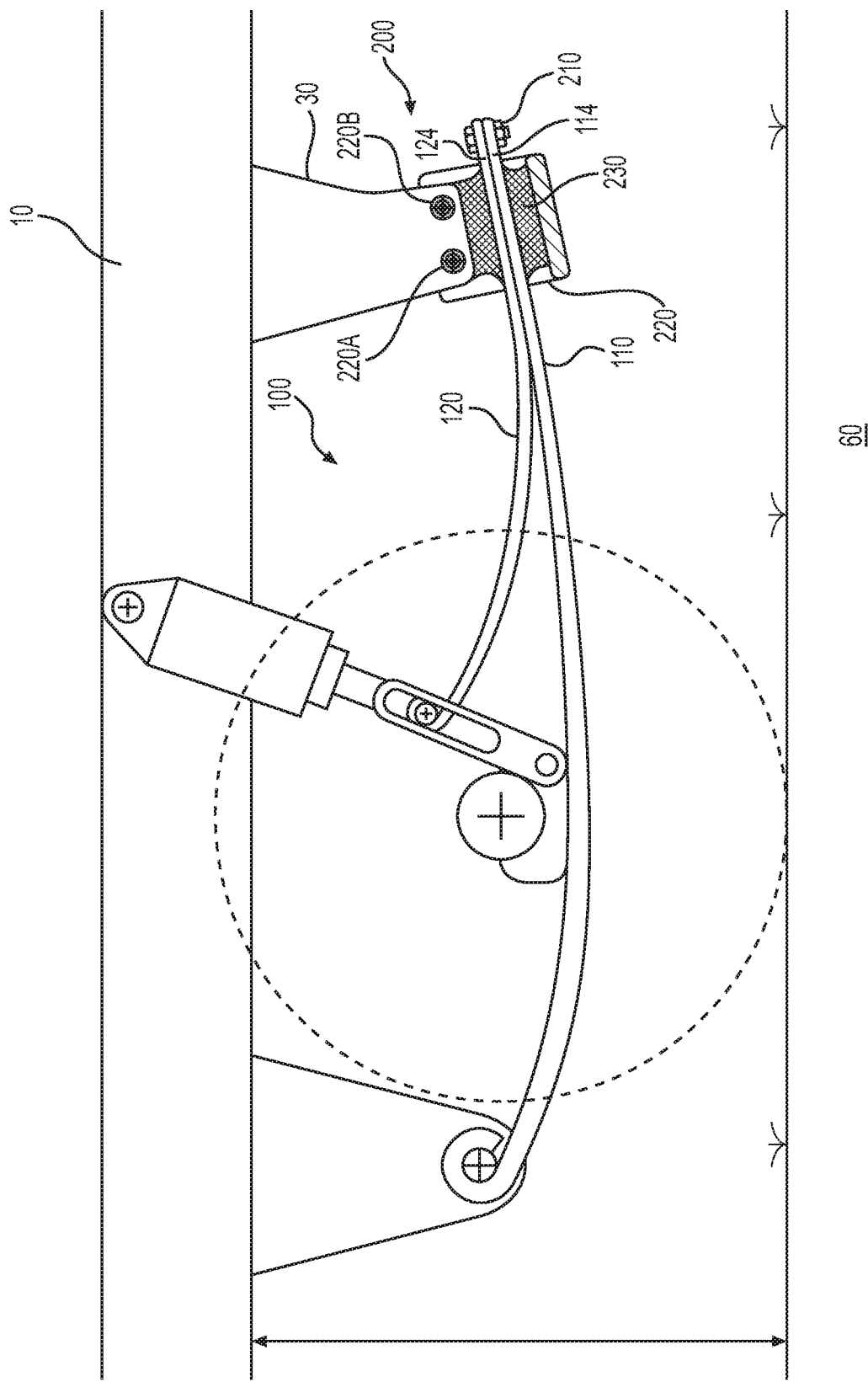
FIG. 2C is a cross-sectional schematic illustration an embodiment of a slipper of the present invention.
Figure 2D:
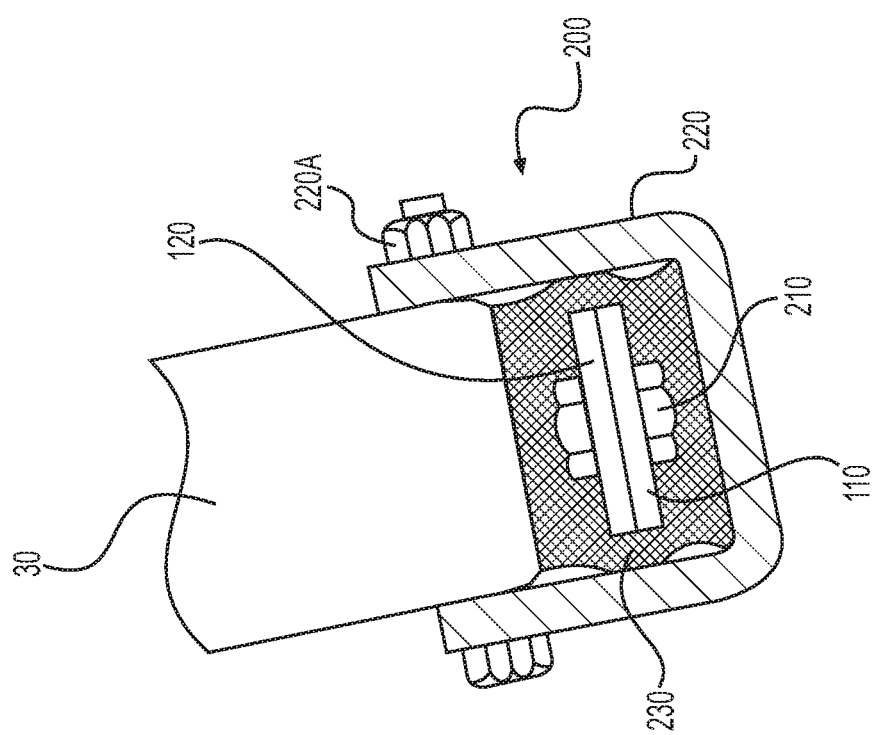
FIG. 2D is a cross-sectional schematic rear view of the slipper of FIG. 2C.

FIG. 2C illustrates an embodiment of a slipper 200 and FIG. 2D is a schematic rear cross-sectional view of the slipper 200 of FIG. 2C. For the slipper embodiment of the invention, the second end 114 of the first spring 110 and the second end 124 of the second spring 120 are supported in the slipper 200 and are bolted together by the bolt 210. The slipper 200 includes a housing 220 and the housing 220 is secured to the rear frame bracket 30 by, for example, bolts 220A, 220B. An elastic material 230 is disposed within the housing 220 and is disposed above and below the springs 110, 120, and completely around the springs. The elastic material 230 is used to support the springs 110, 120 and to isolate vibration. The elastic material 230 can also provide for lateral stability. The elastic material 230 also allows the springs 110, 120 to slip in the fore and aft direction of the vehicle.

Figure 2F:
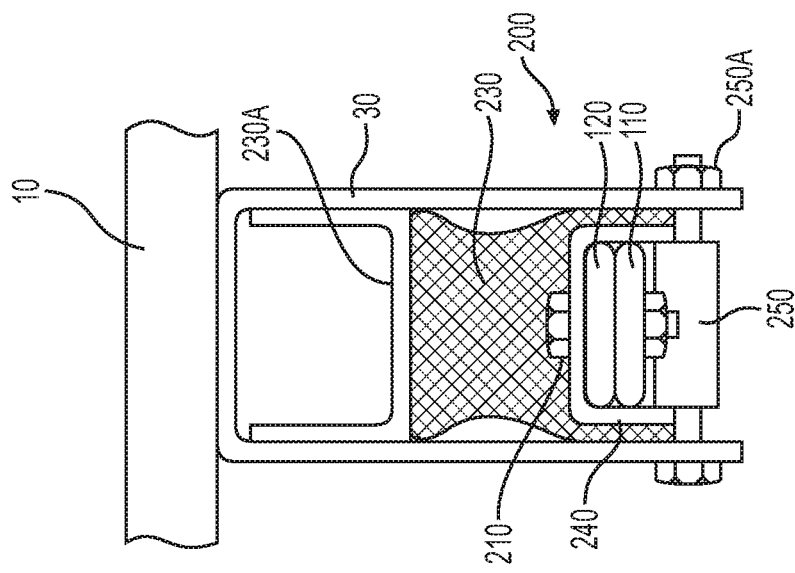
FIG. 2F is a schematic rear view of the embodiment of FIG. 2E.
Figure 2E:
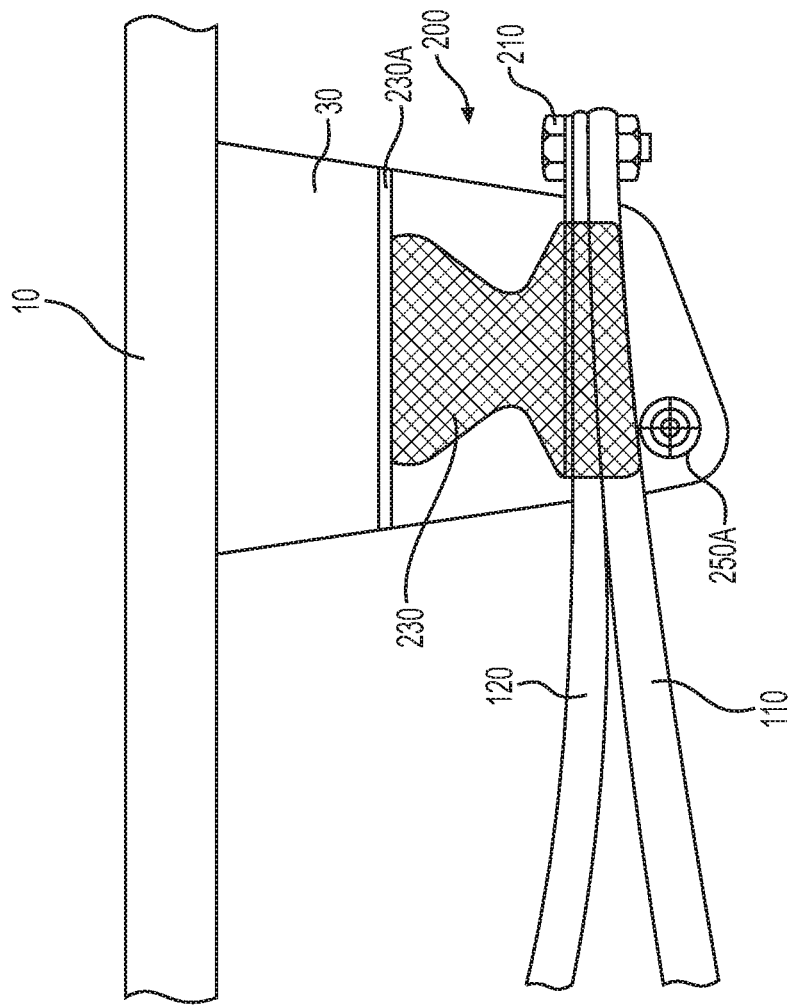
FIG. 2E is a cross-sectional schematic side view of an alternative embodiment of a slipper of the present invention.

FIG. 2E is a cross-sectional schematic side view of an alternative embodiment of a slipper 200 of the present invention and FIG. 2F is a schematic rear view of the embodiment of FIG. 2E. Similar reference characters are used amongst the different embodiments to indicate the same structures.

In this embodiment, the slipper 200 is integrated into the rear frame bracket 30 and also includes the elastic material 230. The elastic material 230 is constrained on a top side by a frame structure 230A that is disposed within the rear frame bracket 30. A saddle 240, which may be steel, is fastened around the fastened springs 110, 120. A rebound roller 250 is provided on the underside of the springs 110, 120. The rebound roller 250 is secured to the rear frame bracket 30 by a securement mechanism 250A, which may be a bolt. The rebound roller clearance with the springs goes to zero when the springs are in the rebound position.

Figure 3:
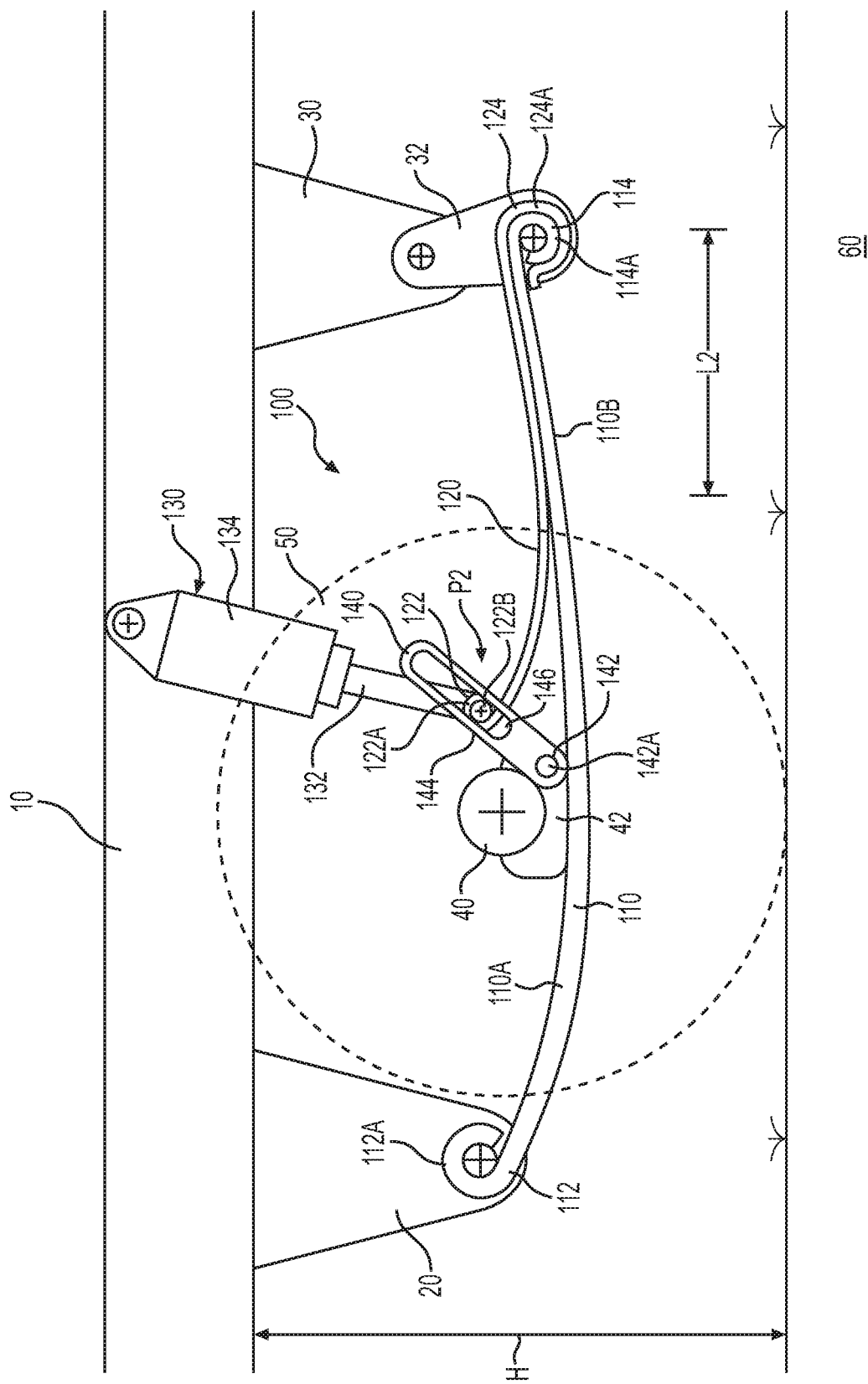
FIG. 3 illustrates the suspension of the present invention where the suspension is in a loaded or fully loaded condition.

FIG. 3 illustrates the suspension 100 of the present invention of FIG. 2A where the suspension is in a loaded or fully loaded condition. As discussed above, the rear portion of the suspension 100 (aft of the axle 40) is the key to the present invention for providing the variable spring rate, constant ride height, and additional lateral load control during turning maneuvers by the suspension. The constant ride height H is accomplished by the suspension control actuator 130 raising and lowering the eye 122A of the second spring 120 which changes the effective spring length and rate of the rear portion 110B of the first spring 110. In the fully loaded condition of FIG. 3, as can be seen and as will be further explained, the suspension control actuator 130 is at or near its full travel to maintain ride height in the fully loaded or maximum rated load position. This moves the contact position of the second spring 120 to the first spring 110 much closer to the axle 40. Thus, the rear portion 110B of the first spring 110 becomes stiffer and stronger with the aid of the second spring 120 by engaging further with the second spring 120. In this position, the eye 122A of the second spring 120 still provides clearance for full jounce travel of the suspension in the loaded condition.

Thus, in FIG. 3, which illustrates the suspension 100 in a fully loaded condition of the vehicle, the first end 122 of the second spring 120 has been moved to a second position P2 by the electrically operated suspension control actuator 130. Thus, the screw jack 132, which is coupled to the first end 122 of the second spring 120, is moved accordingly, i.e., extended from the position of FIG. 2A, to position the first end 122 at the second position P2. When the first end 122 of the second spring 120 is in this second position P2, the second spring 120 engages the first spring 110 over a second length L2. The second length L2 is longer than the first length L1. As discussed above, this engagement of the second spring 120 with the first spring 110 over this longer second length L2 provides for a stiffer and stronger spring rate for the rear portion 110B of the first spring 110 to maintain ride height in this fully loaded condition. As can be seen in FIG. 3, the constant ride height H with respect to the road surface 60 is maintained by the suspension 100 of the present invention also in the fully loaded condition of FIG. 3.

Of course, the present invention is not limited to only positioning the first end 122 of the second spring 120 in two positions. The electrically operated suspension control actuator 130 can position the first end 122 in a full range of positions corresponding to the full range of movement of the screw jack 132. Thus, the second spring 120 is able to progressively engage the first spring 110 corresponding to the range of positions for the first end 122 of the second spring 120.

Corresponding to the description provided above, in the method of the present invention for the ride dynamics mode, the method includes moving the first end 122 of the second spring 120 by the electrically operated suspension control actuator 130 to a first position P1, wherein when the first end 122 of the second spring 120 is in the first position P1 the second spring 120 engages the first spring 110 over a first length L1, and moving the first end 122 of the second spring 120 by the electrically operated suspension control actuator 130 to a second position P2, wherein when the first end 122 of the second spring 120 is in the second position P2 the second spring 120 engages the first spring 110 over a second length L2, wherein the second length L2 is greater than the first length L1.

Further in the method, the moving of the first end 122 of the second spring 120 from the first position P1 to the second position P2 progressively engages the second spring 120 onto the first spring 110. The progressive engagement of the second spring 120 onto the first spring 110 changes a spring rate of the first spring 110.

The positions of the second spring 120, movable by the electrically operated suspension control actuator 130, can be programmed into a computer to effect the ride height positions obtainable by the suspension of the present invention. Control of the electrically controlled suspension can be by a stand-alone suspension control or can be by the electronic braking system of the vehicle. Sensors can be added to the suspension to tell what position the suspension is in. The sensors could be located directly in the suspension control actuator or elsewhere around the suspension. The sensors could also provide a weight of the vehicle. Information about the suspension and the weight of the vehicle could be used by the anti-lock braking systems, electronic braking systems, of the vehicle. Dynamics of the vehicle can be adjusted based on control signals from the electronic braking system. Thus, there can be an association between the control of the suspension and the control of the vehicle braking system.

Figure 4:
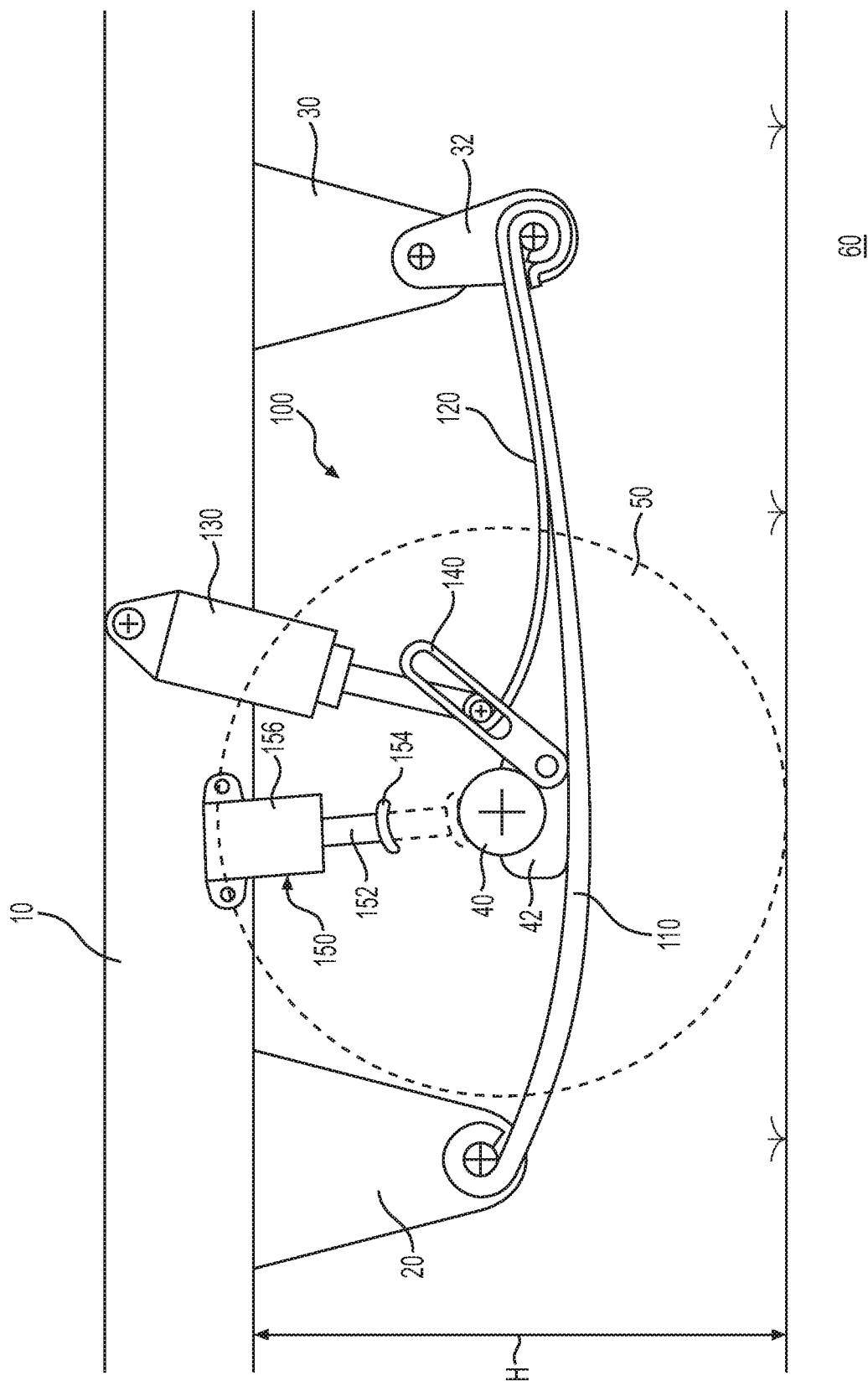
FIG. 4 illustrates a suspension locking device of the suspension of the present invention as used in the docking mode.

FIG. 4 illustrates a suspension locking device 150 of the suspension 100 of the present invention as used in the docking mode, which is an optional mode for locking of the suspension 100. The suspension locking device 150 is a significant advancement over dock locking that is commonly used today because the suspension 100 can be locked in a range of ride heights for better dock compatibility. The suspension locking device 150 is connected to the frame 10 of the vehicle and can include a simple electrically operated engagement member 152 which can be, for example, a screw jack 152 that is controlled by a small rotary motor that enables the suspension 100 to be locked in varying height positions for better matching to various loading dock heights. Thus, like the suspension control actuator 130, the suspension locking device 150 is electrically operated and electrical power to operate the locking device 150 may be provided by the electrical system of the vehicle. The suspension 100 can be raised or lowered as discussed above to match the dock height by the suspension control actuator 130 and the screw jack 152 advances a dock locking engagement member 154 to engage and secure the axle 40 against movement, and thus, to secure the suspension 100 in the desired position for dock loading stability. As such, the suspension locking device can lock the first spring and the second spring in at least a first position and a second position. The first position is an at ready or retracted position while the second position would be locked and used for docking, lift axle, or kneeling positions.

The locking device fixes the trailer frame relative to the axle at the desired height for docking. Once fixed at the desired height, the suspension control actuator pulls on the lift link to prevent any upward movement fixing the position of the trailer to prevent any vertical movement while loading at the dock.

FIG. 4 shows the dock locking engagement member 154 disengaged from the axle 40 (the at ready or retracted position) and additionally shows the dock locking engagement member 154, in phantom, in an engagement/locking position with the axle. As can be understood, the screw jack 152 can be extended from, and retracted into, a housing 156 of the suspension locking device 150 to engage with, and disengage from, the axle 40, respectively. The dock locking engagement member 154 is illustrated as having a semi-circular shape that is complementary to the circumference of the axle, however, it can have any of a variety of other shapes as long engagement of the dock locking engagement member 154 with the axle 40 prevents movement of the axle, particularly movement in an upward direction and in lateral directions.

Further, the dock locking engagement member 154 is not limited to engaging the axle, and thus, it could function by engaging another element(s) of the suspension to lock the suspension against movement.

Thus, via the suspension locking device 150, the suspension 100, and thus the vehicle, can be restrained from movement during a loading/unloading operation of the vehicle such that a stable platform is provided for the loading/unloading operations.

Figure 5A:
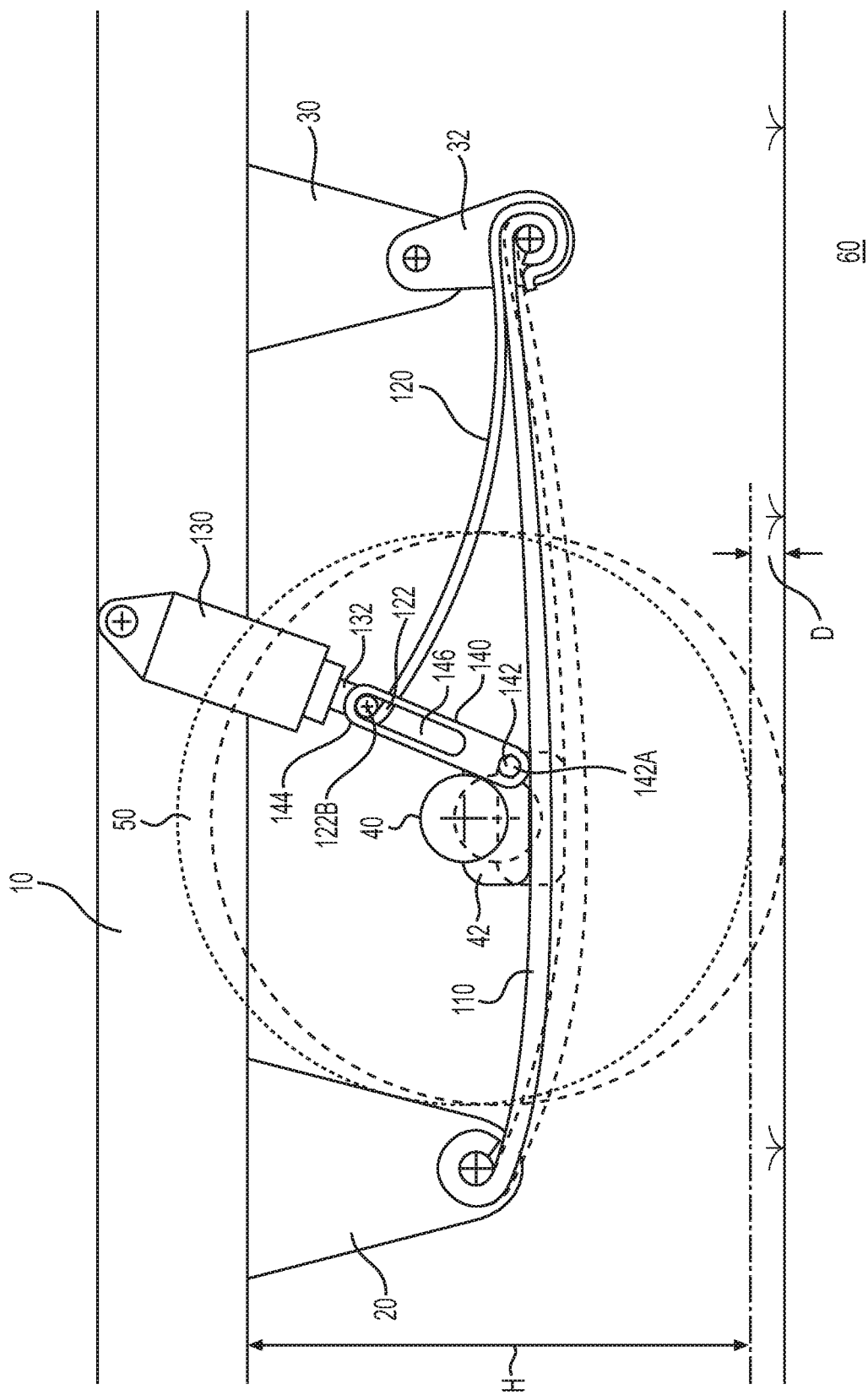
FIG. 5A illustrates the suspension of the present invention as used in the axle lift mode.

FIG. 5A illustrates the suspension 100 of the present invention as used in the axle lift mode. In this mode, the suspension 100 is able to lift the axle 40, and thus the wheel 50, above the road surface 60 for a variety of reasons, including improved fuel economy, axle maintenance, tire changing, wheel end service, etc., and this can provide a significant benefit. This mode is enabled by the lift link 140 which was described above and which is only loaded when needed to raise the suspension 100. The link can be made from any of a variety of materials, including steel and aluminum, and thus is a very inexpensive, economical part.

As described above, the lift link 140 is coupled between the electrically operated suspension control actuator 130 and the first spring 110 and the lift link 140 is movable by the electrically operated suspension control actuator 130. In this embodiment, the lift link 140 is connected to the coupling 42 of the axle 40/first spring 110 at the first end 142 via pin 142A and is coupled to the first end 122 of the second spring 120 and the screw jack 132 of the actuator 130 at the second end 144 via pin 122B.

As can be seen, the screw jack 132 has moved the pin 122B to the upper end of guide 146 where the pin 122B engages with the top end of the guide 146, and thus, the top end of the lift link 140. Because the lift link 140 is attached to the coupling 42 at the lower end of the lift link 140 via pin 142A, continued upward movement of the pin 122B by the screw jack 132 after the pin 122B has engaged with the top end of the lift link 140 will lift the lift link 140, and thus also lift the coupling 42, the axle 40, the first spring 110, and the wheel 50.

FIG. 5A shows the coupling 42, the axle 40, the first spring 110, and the wheel 50 in both their non-lifted positions and their lifted positions. The non-lifted positions for the coupling 42, the axle 40, the first spring 110, and wheel 50 are shown with a dashed phantom line. The lifted positions for the coupling 42, the axle 40, and the first spring 110 are shown in solid lines and the lifted position for the wheel 50 is shown with a dotted phantom line. As can be seen, the wheel 50, and thus the other associated components, have been lifted by a representative distance D of 3 to 4 inches above the road surface 60. Thus, the constant ride height H has been lifted above the road surface 60 by the distance D in the axle lift mode of FIG. 5A.

Figure 5B:
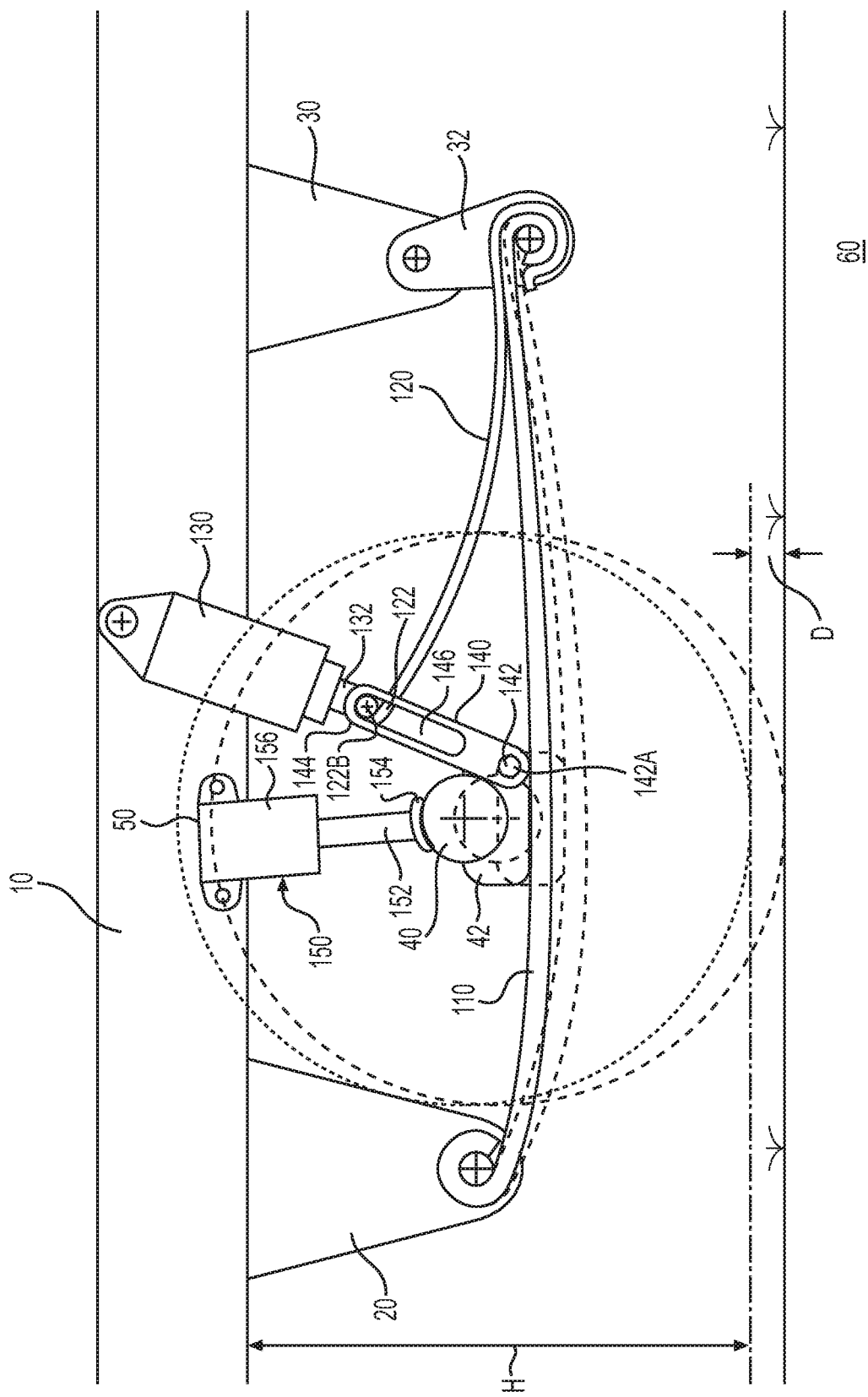
FIG. 5B illustrates the suspension of the present invention with the dock locking engagement member engaged with the axle preventing any compression of the suspension and the lift link is also engaged to prevent any extension of the suspension.

FIG. 5B is similar to FIG. 5A but additionally includes the suspension locking device 150 with the dock locking engagement member 154 engaged with the axle 40 preventing any compression of the suspension and the lift link 140 is also engaged to prevent any extension of the suspension.

Thus, as explained above, the electrically controlled suspension of the present invention takes advantage of the electrical power available on battery electric vehicles (BEVs) to eliminate the need for a heavy, expensive air suspension system used in today's commercial vehicles.

Programmable ride height positions can be obtained for fuel economy at highway speeds and low speed maneuvering.

Further, the invention provides for variable docking height positions for better matching to existing docks and a simple low cost axle-lift system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrically controlled suspension, comprising:
   a first spring with a first end and a second end, wherein the first end of the first spring is connectable to a forward frame bracket of a frame of a vehicle and wherein the second end of the first spring is connectable to a rear frame bracket of the frame of the vehicle via a rear spring support;

a second spring with a first end and a second end, wherein the second end of the second spring is connected to the second end of the first spring; and an electrically operated suspension control actuator, wherein the first end of the second spring is connected to the electrically operated suspension control actuator;

wherein the first end of the second spring is movable by the electrically operated suspension control actuator between a first position and a second position, wherein when the first end of the second spring is in the first position the second spring engages the first spring over a first length, wherein when the first end of the second spring is in the second position the second spring engages the first spring over a second length, and wherein the second length is greater than the first length.

2. The electrically controlled suspension according to claim 1, wherein the first spring is an asymmetrical leaf spring.

3. The electrically controlled suspension according to claim 1, wherein the second end of the first spring includes a spring eye and wherein the spring eye is a down turned eye.

4. The electrically controlled suspension according to claim 3, wherein the second end of the second spring includes an eye, wherein the spring eye of the first spring engages the eye of the second spring, and wherein an outside diameter of the spring eye engages an inside diameter of the eye.

5. The electrically controlled suspension according to claim 1 further comprising a lift link, wherein the lift link is coupled between the electrically operated suspension control actuator and the first spring and wherein the lift link is movable by the electrically operated suspension control actuator.

6. The electrically controlled suspension according to claim 5, wherein when the electrically operated suspension control actuator moves the lift link the first spring is correspondingly moved.

7. The electrically controlled suspension according to claim 5, wherein the lift link defines a guide and wherein the first end of the second spring is guided by the guide.

8. The electrically controlled suspension according to claim 1 further comprising a suspension locking device connectable to the frame of the vehicle and wherein the suspension locking device locks the first spring and the second spring in a position.

9. The electrically controlled suspension according to claim 8, wherein the suspension locking device includes an electrically operated engagement member.

10. The electrically controlled suspension according to claim 1, wherein the electrically operated suspension control actuator includes an electrically movable actuator.

11. The electrically controlled suspension according to claim 1, wherein the rear spring support is a shackle.

12. The electrically controlled suspension according to claim 1, wherein the rear spring support is a slipper.

13. A vehicle, comprising:
a frame with a forward frame bracket and a rear frame bracket;
an axle;
a first spring with a first end and a second end, wherein the first end of the first spring is connected to the forward frame bracket, wherein the second end of the first spring is connected to the rear frame bracket via a rear spring support, and wherein the first spring is attached to the axle;

a second spring with a first end and a second end, wherein the second end of the second spring is connected to the second end of the first spring; and an electrically operated suspension control actuator connected to the frame, wherein the first end of the second spring is connected to the electrically operated suspension control actuator;

wherein the first end of the second spring is movable by the electrically operated suspension control actuator between a first position and a second position, wherein when the first end of the second spring is in the first position the second spring engages the first spring over a first length, wherein when the first end of the second spring is in the second position the second spring engages the first spring over a second length, and wherein the second length is greater than the first length.

14. The vehicle according to claim 13, wherein the first spring is an asymmetrical leaf spring.

15. The vehicle according to claim 13, wherein the second end of the first spring includes a spring eye and wherein the spring eye is a down turned eye.

16. The vehicle according to claim 13 further comprising a lift link, wherein the lift link is coupled between the electrically operated suspension control actuator and the first spring, wherein the lift link is movable by the electrically operated suspension control actuator, and wherein the axle is correspondingly moved when the lift link is moved by the electrically operated suspension control actuator.

17. The vehicle according to claim 13 further comprising a suspension locking device connected to the frame and wherein the suspension locking device engages the axle.

18. The vehicle according to claim 13, wherein the rear spring support is a shackle.

19. The vehicle according to claim 13, wherein the rear spring support is a slipper.

20. A method for operating a vehicle suspension, wherein the vehicle suspension includes:
a first spring with a first end and a second end, wherein the first end of the first spring is connected to a forward frame bracket of a frame of a vehicle and wherein the second end of the first spring is connected to a rear frame bracket of the frame of the vehicle via a rear spring support;

a second spring with a first end and a second end, wherein the second end of the second spring is connected to the second end of the first spring; and an electrically operated suspension control actuator, wherein the first end of the second spring is connected to the electrically operated suspension control actuator;

and comprising the acts of:
moving the first end of the second spring by the electrically operated suspension control actuator to a first position, wherein when the first end of the second spring is in the first position the second spring engages the first spring over a first length; and moving the first end of the second spring by the electrically operated suspension control actuator to a second position, wherein when the first end of the second spring is in the second position the second spring engages the first spring over a second length;

wherein the second length is greater than the first length.

21. The method according to claim 20, wherein moving of the first end of the second spring from the first position to the second position progressively engages the second spring onto the first spring.

22. The method according to claim 21, wherein the progressive engagement of the second spring onto the first spring changes a spring rate of the first spring.

23. The method according to claim 20, wherein the rear spring support is a shackle.

24. The method according to claim 20, wherein the rear spring support is a slipper.

* * * * *